(12) United States Patent
Wiesenfeld

(10) Patent No.: US 6,705,355 B1
(45) Date of Patent: Mar. 16, 2004

(54) WIRE STRAIGHTENING AND CUT-OFF MACHINE AND PROCESS

(76) Inventor: Yair Wiesenfeld, P.O. Box 260, 20 Shabazi St., Yahud 56100 (IL)

( * ) Notice: Subject to any disclaimer, the term of this patent is extended or adjusted under 35 U.S.C. 154(b) by 0 days.

(21) Appl. No.: 10/240,498
(22) PCT Filed: Apr. 3, 2000
(86) PCT No.: PCT/IB00/00602
§ 371 (c)(1), (2), (4) Date: Oct. 1, 2002
(87) PCT Pub. No.: WO01/74513
PCT Pub. Date: Oct. 11, 2001

(51) Int. Cl.[7] ................................................ B21F 11/00
(52) U.S. Cl. ......................................... 140/140; 83/298
(58) Field of Search .......................... 140/140; 83/208, 83/602, 628, 298; 72/72

(56) References Cited

U.S. PATENT DOCUMENTS

| | | | |
|---|---|---|---|
| 3,405,577 A | * 10/1968 | Cousino | 83/861 |
| 3,742,798 A | * 7/1973 | Gries | 83/298 |
| 3,760,669 A | * 9/1973 | Rosenthal et al. | 83/63 |
| 4,257,295 A | * 3/1981 | Patel | 83/374 |
| 4,544,397 A | * 10/1985 | Fenton | 65/332 |
| 4,739,490 A | * 4/1988 | Hayashi et al. | 700/167 |
| 5,065,653 A | * 11/1991 | Werner | 83/199 |

* cited by examiner

*Primary Examiner*—Lowell A. Larson
(74) *Attorney, Agent, or Firm*—Irving M. Weiner; Pamela S. Burt; Weiner & Burt, P.C.

(57) ABSTRACT

A wire straightening and cut-off process and machine which feeds, straightens, and cuts wire, and which uses a servo-motor in dual mode. In a continuous mode, short wire parts are cut at a high cut-off rate. In an intermittent mode, long wire parts are cut wherein each cut is triggered by a signal.

20 Claims, 2 Drawing Sheets

WIRE STRAIGHTENING AND CUT-OFF MACHINE AND PROCESS

The present invention relates generally to a wire straightening and cut-off machine and process. In particular, the present invention relates to a machine and process which uses a servomotor in a dual mode, wherein the servomotor may be used as a regular motor in a continuous mode or operation, and/or may be used as a servomotor in an intermittent mode or operation.

BACKGROUND OF THE INVENTION AND DESCRIPTION OF THE RELEVANT ART

The present invention has a plethora of applications, and is particularly suitable for use in a straightening and cut-off machine application which is used to feed, straighten, and cut wire.

Conventional techniques addressing this particular application have proved inadequate, complicated, bulky, and/or expensive.

The relevant art is exemplified by the following United States patents.

U.S. Pat. No. 4,391,307 issued in 1983 to Levi et al. entitled "WIRE STRAIGHTENING AND CUTTING MECHANISM" discloses a cutting mechanism correlated with the driving of feed rolls to cut the wire, once straightened, into predetermined lengths. The lengths of wire cut can be varied by varying the speed of the cutter relative to the speed of advancement of the wire. A main motor drive includes a speed reducer into a drive pulley for power transmission belt that runs over a driven pulley on shaft that is drivingly connected to a lower feed roller. Another power transmission belt runs over pulleys to rotate the into another speed reducer that, via a power transmission belt running over other pulleys, leads into a speed changer. A cutter disk is mounted on a drive shaft.

U.S. Pat. No. 5,570,728 issued in 1996 to Benedict et al. entitled "WIRE FEEDING AND CUTTING MACHINE" discloses a machine that can be operated at high wire feed and cutoff speeds. The machine includes a mechanism driven through a one-revolution type clutch-brake unit for operating the wire cutter and movable closure member at high speed, while reducing reflected inertia loads on the clutch-brake unit.

U.S. Pat. No. 5,850,773 issued in 1998 to Burns entitled "APPARATUS FOR CUTTING WIRE" discloses a cutting apparatus used in conjunction with a feed mechanism, a straightening apparatus, and a wire supply. The cutter apparatus is free of return springs.

It is a desideratum of the present invention to avoid the animadversions of the conventional devices and techniques.

The present invention, in addition to eliminating and/or avoiding the problems and disadvantages attendant to the conventional devices and techniques, provides a novel apparatus possessing new and desirable features .

SUMMARY OF THE INVENTION

The present invention provides a novel wire straightening and cut-off process, comprising the steps of: supplying a source of substantially continuous wire to a wire straightener and feeder apparatus; feeding and straightening said wire; and cutting the straightened wire under control of a servomotor used in a dual mode.

The present invention further provides a wire straightening and cut-off machine, comprising: a source of substantially continuous wire; first means for feeding and straightening said wire; second means for cutting the straightened wire under control of a servomotor used in a dual mode; and said source of said substantially continuous wire, said first means, and said second means being operatively interconnected.

The present invention also provides a wire straightening and cut-off machine, comprising: a source of substantially continuous wire; first means for feeding and straightening said wire; second means for cutting the straightened wire; said source of said substantially continuous wire, said first means, and said second means being operatively interconnected; said second means including a servomotor which is selectively operable in a continuous mode or in an intermittent mode, a mechanical reduction gear driven by said servomotor, a rotatable disc operatively connected to said mechanical reduction gear, and a knife for cutting said wire; and said second means further including third means for controlling the number of times said knife cuts said wire during a predetermined period of time.

It is an object of the present invention to provide a novel straightening and cut-off process.

Another object of the invention is to provide a novel wire straightening and cut-off machine which uses a servomotor in a variable speed mode for a continuous speed cut, and in an intermittent mode for cutting when receiving a signal to do so.

A further object of the present invention to provide a novel machine as described herein which combines the advantages of continuous rotation for the high cut-off rate of short wire parts, with the length accuracy of an intermittent cut triggered by a signal used for long wire parts.

Additional objects, features, and advantages of the invention will become apparent from the following detailed description and accompanying drawings.

DETAILED DESCRIPTION OF ONE POSSIBLE PREFERRED EMBODIMENT OF THE INVENTION

Figure 1:
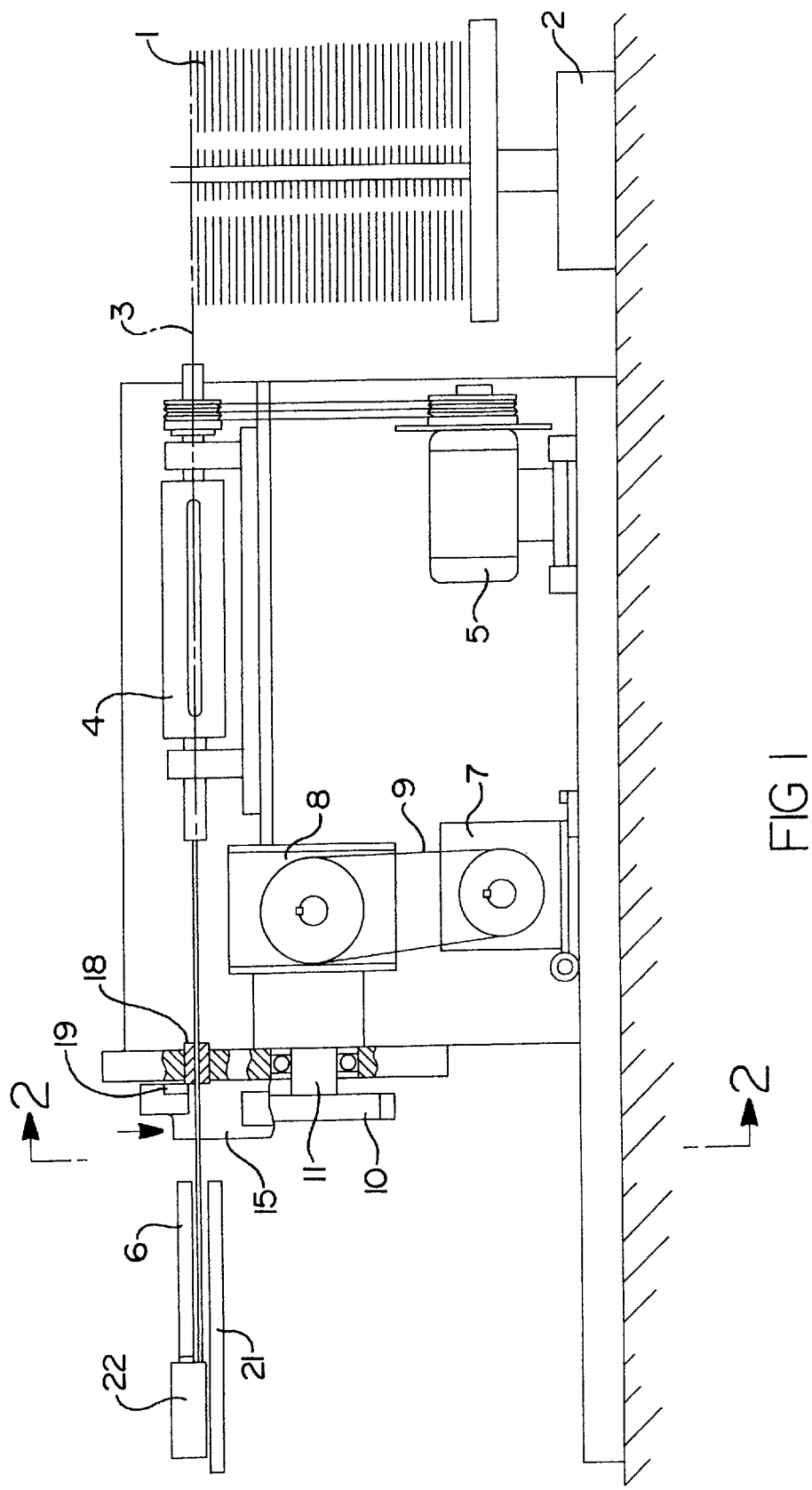
FIG. 1 illustrates an elevational view of a preferred embodiment of the invention used in a wire straightening and cut-off machine.
Figure 2:
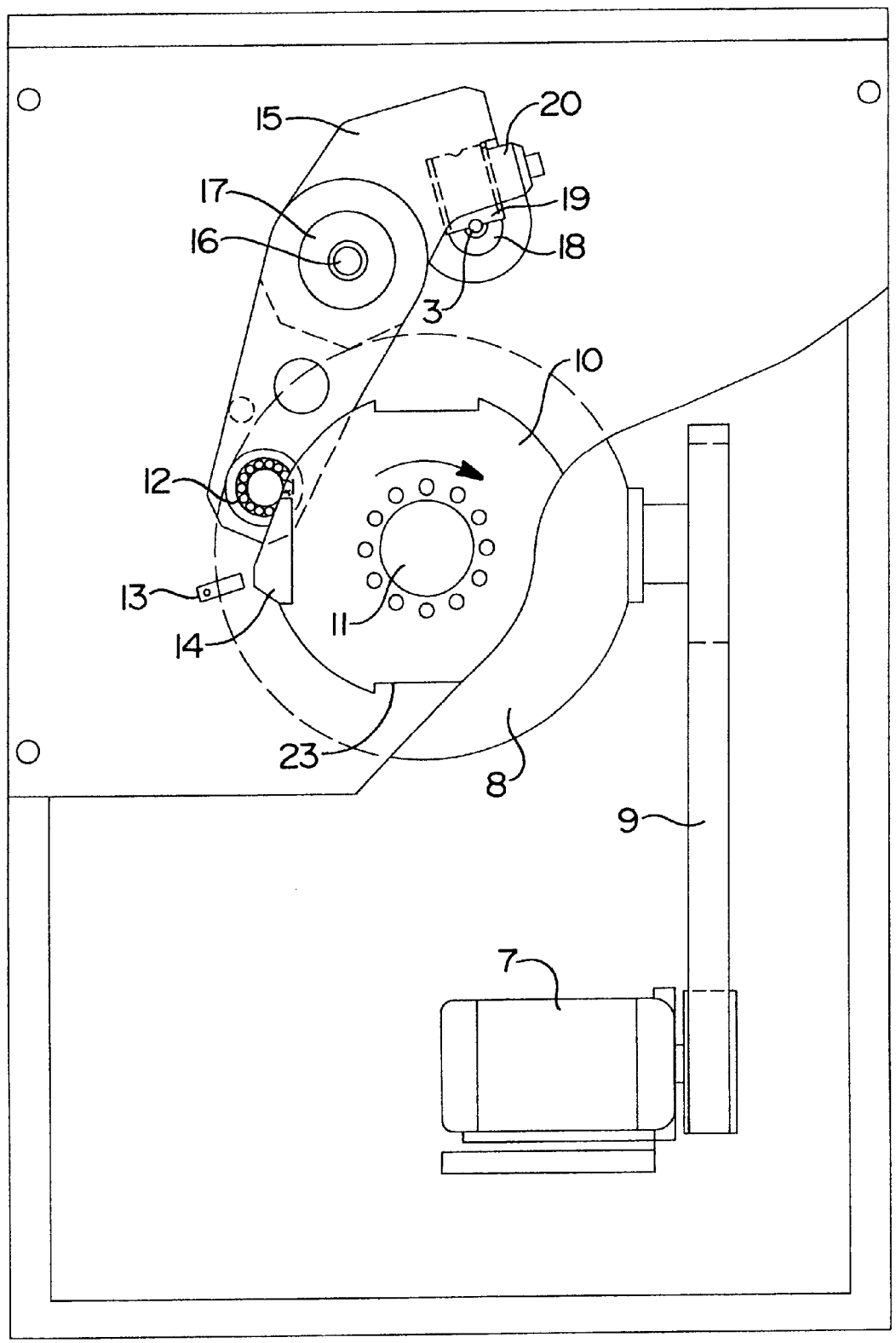
FIG. 2 depicts an elevational view taken along line 2—2 in FIG. 1.

With reference to FIGS. 1 and 2, there is shown a preferred embodiment of the present invention employed in a wire straightening and cut-off machine.

As illustrated in FIG. 1, a wire coil 1 is disposed on an uncoiler 2. Alternatively, the wire 3 may be supplied in bars or in any other suitable form.

The wire 3 from the wire coil 1 passes to and through a wire straightener and feeder unit 4. A straightener motor 5 drives the wire straightener and feeder unit 4. The wire straightener and feeder unit 4 includes a suitable feeder device and a straightener device. The feed device controls the speed at which the wire 3 moves or is fed through the machine.

After the wire 3 has been straightened, the wire 3 travels to the cut-off system and along a run-off guide 6.

The cut-off system includes a servomotor 7, a mechanical reduction gear 8, a timing belt 9 or other drive means, a rotating disc 10 mounted on a main spindle or output shaft 11, a cam follower 12, a microswitch or proximity sensor 13, a cutter insert 14, a cut-off arm 15, a torsion bar 16, a cut-off shaft 17, a cut-off quill 18, a cut-off knife 19, and a knife clamp 20.

As illustrated in FIG. 1, the wire 3 travels between the run-off guide 6 and a run-off gate 21 or other wire support device. There is also provided an electronic/mechanical positive stop 22.

The novel wire straightening and cut-off machine uses the servomotor 7 in a variable speed mode for a continuous speed cut, and in an intermittent mode to cut when receiving a signal. Thus, the novel machine and process combines the advantages of continuous rotation for a high cut-off rate for short parts, with the length accuracy of intermittent cut triggered by a signal used for long parts.

The straightening and cut-off machine is used to feed, straighten, and cut the wire 3. The wire 3 is supplied in coils 1 or bars. The machine feeds the wire 3, straightens it, and cuts it to the desired length.

The output of the machine is measured in pieces per minute, or per hour, or per day, etc. The feed device controls the speed at which the wire 3 travels. The cut-off system controls the cut-off rate. For a given wire speed, the longer wire parts will be cut at a lower PPM (parts per minute) rate, while the shorter wire parts will be cut more rapidly.

In particular, after the wire 3 has been straightened, the wire 3 travels along the run-off guide 6, and is cut to length by the cut-off system after receiving a signal through a length measuring device, such as, for example, an encoder, a servo positioning motor, or by activating a sensor. In this manner, the wire 3 is always cut to the correct desired length, as its position is detected.

For short cuts, it is possible to cut by a revolving cam which is turning at a steady rate, counting on the wire 3 to travel a more or less fixed distance or length between cuts.

An essential feature of the present invention resides in the combined use of the servomotor 7, which is capable of operating in an intermittent mode as well as in a continuous mode, in conjunction with a mechanical reduction gear 8 which converts the high-speed revolutions of the servomotor 7 to a low-speed high-torque operation.

The servomotor 7 drives the mechanical reduction gear 8 by way of the timing belt 9 or other drive means. The mechanical reduction gear 8 has an output shaft or main spindle 11 upon which is installed the rotating disc 10. The rotating disc 10 is provided with a plurality of recesses 23 in which the cutter inserts 14 may be installed.

When the rotating disc 10 with the installed insert or inserts 14 rotates, the inserts 14 contact or hit the cam follower 12 of the cutting mechanism of the machine, causing a cut or cuts to be performed. Each time an insert 14 passes or contacts the cam follower 12 one cut is performed.

The servomotor 7, which drives the mechanical reduction gear 8, is employed in two different modes of operation which will be explained further hereinbelow.

In the intermittent operation mode, a signal is used to start a single cut of the wire 3. Only one cutter insert 14 is installed on the rotating disc 10. Each time a signal is given, the servomotor 7 drives the mechanical reduction gear 8 until the output shaft 11 performs exactly one revolution, and stops at the sensor 13. Because only one insert 14 was installed, one cut of the wire 3 will be performed.

In the continuous operation mode, a plurality of cutter inserts 14 are installed in the rotating disc 10, and the revolutions per minute of the servomotor 7 is adjusted by changing the input frequency. This mode is used for continuous rotation to achieve continuous cut-off. The number of cutter inserts 14 installed multiplied by the number of revolutions per minute of the output shaft 11 gives the number of cuts per minute.

The cut-off knife 19 is operated in accordance with above-described modes of operation.

The positive stop 22 can be either mechanical for the continuous operation, or electronic when activating the intermittent operation.

The rotating disc 10 may be provided with any number of recesses 23 for receiving the cutter inserts 14. In a preferred embodiment of the invention, ten such recesses 23 are provided on the rotating disc 10.

It should be noted that in FIG. 2 the cutter insert 14 is shown in a stopped position ready for the next cut of the wire 3.

The foregoing description is intended only to be illustrative, but not limiting, of the present invention. The present invention is intended to cover various modifications and equivalent arrangements which come within the scope of the invention.

There has been illustrated in the accompanying drawings and described hereinabove only one unique and novel preferred embodiment of the present invention which can be constructed and utilized in a plethora of different ways. It should be understood that many changes, modifications, variations, and other uses and applications will become apparent to those persons skilled in this particular area of technology and to others after having been exposed to the present specification and accompanying drawings. Any and all such changes, modifications, variations, and other uses and applications which do not depart from the spirit and scope of the present invention are therefore covered by and embraced within the present invention and the patent claims set forth hereinbelow.

What is claimed is:

1. A wire straightening and cut-off process, comprising the steps of supplying a source of substantially continuous wire to a wire straightener and feeder apparatus;

feeding and straightening said wire; and cutting the straightened wire under control of a servomotor used in a dual mode.

2. The process of claim 1, wherein:

said cutting step can be selectively performed in a continuous mode and/or in an intermittent mode.

3. The process of claim 1, wherein:

said cutting step is performed in a continuous mode.

4. The process of claim 2, wherein:

said cutting step is performed in said continuous mode.

5. The process of claim 1, wherein:

said cutting step is performed in an intermittent mode.

6. The process of claim 2, wherein:

said cutting step is performed in said intermittent mode.

7. A wire straightening and cut-off machine, comprising:

a source of substantially continuous wire;

first means for feeding and straightening said wire;

second means for cutting the straightened wire under control of a servomotor used in a dual mode; and said source of said substantially continuous wire, said first means, and said second means being operatively interconnected.

8. The machine of claim 7, wherein:

said second means can be selectively operated in a continuous mode and/or in an intermittent mode.

9. The machine of claim 7, wherein:

said second means is operated in a continuous mode.

10. The machine of claim 8, wherein:

said second means is operated in said continuous mode.

11. The machine of claim 7, wherein:

said second means is operated in an intermittent mode.

12. The machine of claim 8, wherein:

said second means is operated in said intermittent mode.

13. A wire straightening and cut-off machine, comprising:

a source of substantially continuous wire;

first means for feeding and straightening said wire;

second means for cutting the straightened wire;

said source of said substantially continuous wire, said first means, and said second means being operatively interconnected;

said second means including a servomotor which is selectively operable in a continuous mode or in an intermittent mode, a mechanical reduction gear driven by said servomotor, a rotatable disc operatively connected to said mechanical reduction gear, and a knife for cutting said wire; and said second means further including third means for controlling the number of times said knife cuts said wire during a predetermined period of time.

14. The machine of claim 13, wherein:

said mechanical reduction gear has an output shaft; and said rotatable disc is mounted on said output shaft.

15. The machine of claim 14, wherein:

said rotatable disc may be selectively provided with one or more cutter inserts;

there is provided a cutter mechanism which includes a cam follower and said knife; and wherein when each said cutter insert hits said cam follower, said cutter mechanism causes said knife to perform a cut of said wire.

16. The machine of claim 15, including:

a proximity sensor positioned adjacent said rotatable disc;

only one said cutter insert provided on said rotatable disc; and wherein said intermittent mode a signal starts a single cut of said wire, and each time said signal is given, said servomotor drives said mechanical reduction gear until said mechanical reduction gear performs one revolution and stops at said proximity sensor.

17. The machine of claim 15, wherein:

said rotatable disc is provided with a plurality of said cutter inserts; and wherein said continuous mode the speed of said servomotor is adjusted by changing the input frequency thereto.

18. The machine of claim 13, wherein:

said rotatable disc may be selectively provided with one or more cutter inserts;

there is provided a cutter mechanism which includes a cam follower and said knife; and wherein when each said cutter insert hits said cam follower, said cutter mechanism causes said knife to perform a cut of said wire.

19. The machine of claim including:

a proximity sensor positioned adjacent said rotatable disc;

only one said cutter insert provided on said rotatable disc; and wherein said intermittent mode a signal starts a single cut of said wire, and each time said signal is given, said servomotor drives said mechanical reduction gear until said mechanical reduction gear performs one revolution and stops at said proximity sensor.

20. The machine of claim 18, wherein:

said rotatable disc is provided with a plurality of said cutter inserts; and wherein said continuous mode the speed of said servomotor is adjusted by changing the input frequency thereto.

* * * * *